(12) United States Patent
Jones et al.

(10) Patent No.: US 8,111,832 B2
(45) Date of Patent: Feb. 7, 2012

(54) METHOD OF ADJUSTING ACOUSTIC IMPEDANCES FOR IMPEDANCE-TUNABLE ACOUSTIC SEGMENTS

(75) Inventors: Kennie H Jones, Poquoson, VA (US); Douglas M. Nark, Norfolk, VA (US); Michael G. Jones, Newport News, VA (US); Tony L. Parrott, Williamsburg, VA (US); Kenneth N. Lodding, Williamsburg, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 435 days.

(21) Appl. No.: 12/424,793

(22) Filed: Apr. 16, 2009

(65) Prior Publication Data

US 2010/0006368 A1    Jan. 14, 2010

Related U.S. Application Data

(60) Provisional application No. 61/045,368, filed on Apr. 16, 2008.

(51) Int. Cl.
*G10K 11/16* (2006.01)

(52) U.S. Cl. .................. 381/71.1; 415/119

(58) Field of Classification Search .......... 415/119; 381/71.1

See application file for complete search history.

(56) References Cited

U.S. PATENT DOCUMENTS

| | | | | |
|---|---|---|---|---|
| 3,991,849 A * | 11/1976 | Green et al. | | 181/296 |
| 4,044,203 A * | 8/1977 | Swinbanks | | 381/71.5 |
| 4,700,177 A * | 10/1987 | Nakashima et al. | | 340/388.3 |
| 4,967,550 A * | 11/1990 | Acton et al. | | 60/794 |
| 5,315,661 A * | 5/1994 | Gossman et al. | | 381/71.1 |
| 5,386,689 A * | 2/1995 | Bozich et al. | | 60/803 |
| 5,415,522 A * | 5/1995 | Pla et al. | | 415/118 |
| 5,423,658 A * | 6/1995 | Pla et al. | | 415/118 |
| 5,498,127 A * | 3/1996 | Kraft et al. | | 415/119 |
| 5,515,444 A * | 5/1996 | Burdisso et al. | | 381/71.5 |
| 5,702,230 A * | 12/1997 | Kraft et al. | | 415/119 |
| 5,791,869 A * | 8/1998 | Lee | | 415/119 |
| 5,979,593 A * | 11/1999 | Rice et al. | | 181/207 |
| 6,002,778 A * | 12/1999 | Rossetti et al. | | 381/71.4 |
| 6,031,917 A * | 2/2000 | Mathur | | 381/71.11 |
| 6,811,372 B1 * | 11/2004 | Emborg et al. | | 415/119 |
| 7,075,455 B2 * | 7/2006 | Nishimura et al. | | 340/870.28 |
| 7,210,897 B2 * | 5/2007 | Kobayashi | | 415/118 |
| 7,530,426 B2 * | 5/2009 | Berkhoff | | 181/206 |
| 7,607,287 B2 * | 10/2009 | Reba et al. | | 60/226.1 |
| 2010/0006368 A1 * | 1/2010 | Jones et al. | | 181/213 |

* cited by examiner

*Primary Examiner* — Elvin G Enad
*Assistant Examiner* — Robert W Horn
(74) *Attorney, Agent, or Firm* — Andrea Z. Warmbier; Helen M. Galus

(57) ABSTRACT

A method is provided for making localized decisions and taking localized actions to achieve a global solution. In an embodiment of the present invention, acoustic impedances for impedance-tunable acoustic segments are adjusted. A first acoustic segment through an N-th acoustic segment are defined. To start the process, the first acoustic segment is designated as a leader and a noise-reducing impedance is determined therefor. This is accomplished using (i) one or more metrics associated with the acoustic wave at the leader, and (ii) the metric(s) associated with the acoustic wave at the N-th acoustic segment. The leader, the N-th acoustic segment, and each of the acoustic segments exclusive of the leader and the N-th acoustic segment, are tuned to the noise-reducing impedance. The current leader is then excluded from subsequent processing steps. The designation of leader is then given one of the remaining acoustic segments, and the process is repeated for each of the acoustic segments through an (N−1)-th one of the acoustic segments.

31 Claims, 2 Drawing Sheets

METHOD OF ADJUSTING ACOUSTIC IMPEDANCES FOR IMPEDANCE-TUNABLE ACOUSTIC SEGMENTS

Pursuant to 35 U.S.C. §119, the benefit of priority from provisional application 61/045,368, with a filing date of Apr. 16, 2008, is claimed for this non-provisional application.

ORIGIN OF THE INVENTION

The invention was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to networks of sensors and actuators. More specifically, the invention is a method of employing a communal network of sensors and actuators to achieve a global objective based on localized decisions.

2. Description of the Related Art

Networks of sensors, actuators, and computers have been employed in numerous applications for several decades. For example, automobiles and aircraft contain sensor networks to monitor system health and manage performance. Mass transit systems augment human control with sensor networks that constantly monitor the location and speed of all traffic to ensure safety and efficiency. Sensor networks are extensively used to control environments and provide intrusion detection for buildings and complexes. Sensor networks are also used to control complex industrial processes to enhance efficiency of the manufacturing process, as well as to prevent disasters. Because of cost, size, and other constraints, these networks have typically been restricted to relatively small numbers of components. The conventional architecture of these networks positions a computer at some central location to collect sensor data, process that data, and issue commands to control some process response.

The advent of Micro-Electrical-Mechanical Systems (MEMS) technology in the last decade has made it possible to build inexpensive, small, self-powered devices containing a sensor, a computer, and wireless communication capability. These devices are sometimes referred to as "motes" to emphasize their small size or "nodes" to emphasize their role in a sensor network. It is expected that massive numbers of these small devices will be deployed in Wireless Sensor Networks (WSN) that can change the way we live and work by monitoring and modifying the environment.

Current WSN approaches concentrate on establishing networks for collection of sensor information and then routing that information to a centralized processor. That is, current sensor networks operate on a "sense and send" philosophy. These "sense and send" implementations rely on a central computer that must handle/process large amounts of data from the "global" (i.e., entire) set of sensors in the network. Thus, processing capability and cost are major constraints limiting the number of sensors that may be deployed using the "sense and send" philosophy. Accordingly, there are many applications where the "sense and send" philosophy is just not practical. One such application is aircraft noise attenuation.

Anyone who has stood near a modern aircraft is aware of the noise produced by the engines. Engine noise levels are not constant as they increase dramatically during takeoff and landing. This has led to potentially dangerous noise-abatement flight paths with steep turns and rapid altitude changes that are frequently required to minimize the noise for communities surrounding an airport. Some airports charge airlines based on quantity of noise "pollution" created by their aircraft. Thus, it is desirable to attenuate the noise by maximizing absorption under changing conditions.

One approach to noise abatement in an aircraft engine (e.g., a turbofan engine) is the application of acoustic treatment within the inner walls of the engine's nacelle. As sound propagates through the nacelle, noise is reduced or attenuated by the liner. The amount of attenuation is determined by design characteristics of the liner. Designing liners for optimal noise attenuation is complicated by the following factors:

(i) The aeroacoustic environment changes throughout the flight regime with non-negligible variations in frequency content.

(ii) The theoretical parameters specified in the design may not be met in the construction of the liner material.

(iii) Physical changes over time in the nacelle or the liner (e.g., contamination) change the noise absorption properties. Unfortunately, the multi-layer static liners that are currently used to address these factors add excess weight to the aircraft.

SUMMARY OF THE INVENTION

Accordingly, it is an object of the present invention to provide an efficient method of using the outputs of a network of observers or sensors to generate decisions and/or actions in response to the outputs.

Another object of the present invention is to provide an efficient method of adapting locally to changing noise conditions using an impedance-tunable arrangement of acoustic elements where impedance changes are determined and implemented at the acoustic elements.

Other objects and advantages of the present invention will become more obvious hereinafter in the specification and drawings.

In accordance with the present invention, a method employing a communal network of sensors and actuators is provided for reaching global objectives based on localized decisions. In an embodiment of the present invention, a method of adjusting acoustic impedances for impedance-tunable acoustic segments is provided. A plurality of impedance-tunable acoustic segments are exposed to an acoustic wave. A first acoustic segment through an N-th acoustic segment are defined. The first acoustic segment is designated as a leader. A noise-reducing impedance is then determined for the acoustic segment so-designated as the leader using (i) at least one metric associated with the acoustic wave at the leader, and (ii) the metric(s) associated with the acoustic wave at the N-th acoustic segment. The leader, N-th acoustic segment, and remaining ones of the acoustic segments exclusive of the leader and N-th acoustic segment, are then tuned to the noise-reducing impedance so-determined. The leader so-tuned is then excluded from subsequent steps in the method. Next, one of the remaining acoustic segments is re-designated as a leader. The steps beginning with the noise-reducing impedance determination are then repeated for each of the acoustic segments through an (N−1)-th one of the acoustic segments.

DETAILED DESCRIPTION OF THE INVENTION

The present invention describes a general approach that achieves global effects from sets of locally-made decisions determined by a communal network of observations, where the locally-made decisions are implemented by locally-based "actuators", i.e., any device or system capable of implementing an action that affects the actuator's local environment. That is, the present invention employs an architecture that accomplishes a global goal using a community of cooperative, intelligent, and autonomous sensors/actuators instead of the centralized-processing "sense and send" approach.

The present invention's architecture eliminates single-point failures common to centralized approaches, thereby producing a significantly more persistent and scalable network solution. In addition to eliminating the potential for single-points of failure, the present invention's architecture enhances efficiency by reducing action response time to changing environmental conditions as processing is taking place where sensing and acting are occurring. Using this approach, it has been found that a number of communities acting locally and autonomously can generate an effective global solution that, while it may not be the absolute best solution, represents a good solution arrived at through computational simplicity and efficiency. As a result, the general approach described herein can be adapted to a wide variety of applications suitable for division into local communities of sensors/actuators. As used herein the term "global" refers to a collection of local communities, each of which can operate independently of other communities. Therefore, the term "local" refers to a subset of the global collection or one independent community where members of a local community can be physically local or logically local.

As previously pointed out, the present invention's architectural design employs a cooperative community of autonomous and asynchronous sensors/actuators. Individual agents/nodes collect local observations, share these with neighbors, and use this information to make local decisions on how to individually adjust actuators to produce a desired local effect. The union of individual decisions across the community of sensors/actuators results in community-wide adjustments that will adapt dynamically to changes in the sensed conditions. This approach requires far less infrastructure and coordination than a centralized approach.

Figure 1:
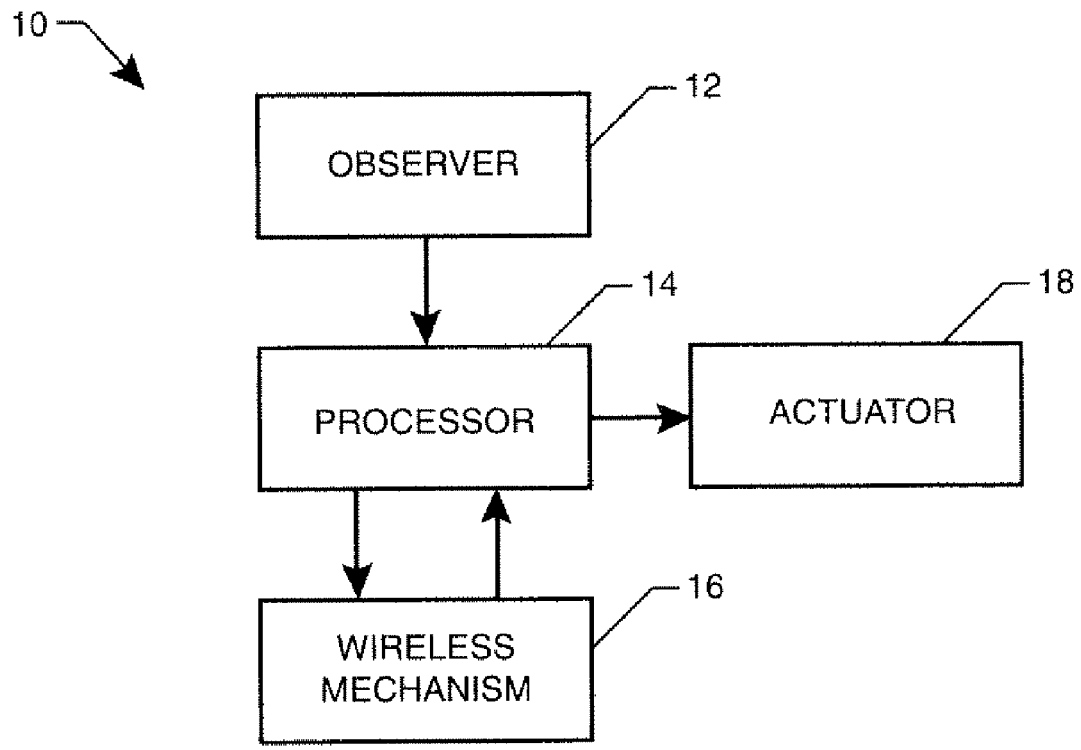
FIG. 1 is a schematic view of a wireless sensor/actuator node used in implementing methods of the present invention.

The general approach of the present invention will be described, and will be followed with a description of a specific example. Referring now to the drawings and more particularly to FIG. 1, a wireless sensor and actuator node used in the present invention is shown and is referenced generally by numeral 10. A local community will have a number of nodes 10. Each node 10 includes one or more observers 12, a processor 14, a wireless mechanism 16 for local communication, and one or more actuators 18. An observer 12 is any autonomously operating sensor (e.g., acoustic, chemical, vibration, electrical, etc.), camera, or other observation device capable of collecting local observations of interest. Processor 14 is any of a variety of processing units capable of interfacing with the other elements of node 10, as well as performing prescribed processing of the observation by observer 12 and, possibly, the observations made by other nodes 10 in the local community. Wireless mechanism 16 is any device/approach that can be used to transfer data between other nodes 10 in the local community. Such wireless approaches include radio frequency, microwaves, molecular communication, etc. It is to be further understood that while wireless communication will typically be used to transfer data between nodes 10, the present invention could also be implemented with hard-wire forms of data transfer without departing from the scope of the present invention. An actuator 18 is any device/system that can generate a response (as controlled processor 14) that will affect the local environment in a prescribed fashion. Accordingly, actuator 18 is representative of a variety of devices/systems, the particular choice of which is not a limitation of the present invention.

Figure 2:
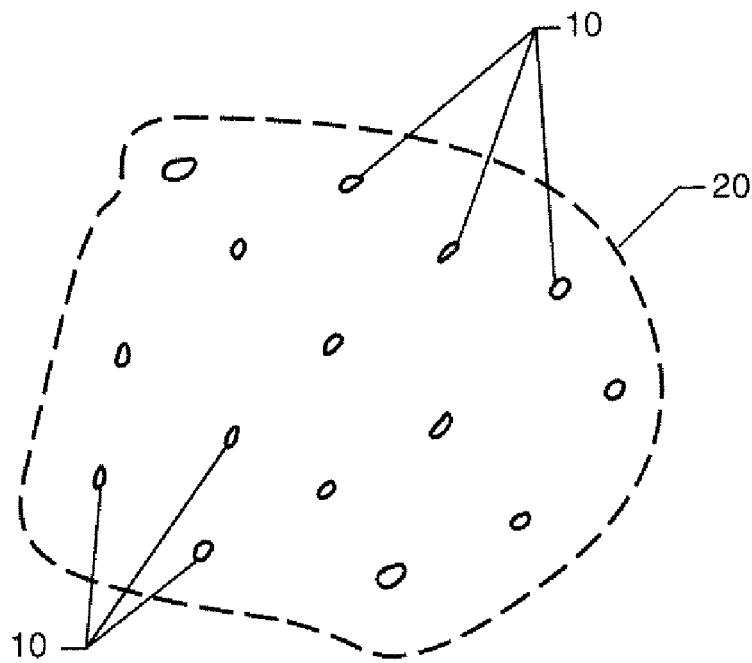
FIG. 2 is a schematic view of a local community of wireless sensor/actuator nodes.

The general approach using nodes 10 will be described with the aid of FIG. 2 where a number of nodes 10 are distributed (i.e., in a physically or logically ordered arrangement) in one, two, or three dimensions within a local community designated by dashed lines boundary 20. It is to be understood that there will typically be other nodes outside of boundary 20, but that any such nodes outside of boundary 20 are not known to nodes 10 within boundary 20. The term "boundary" as used herein can define a physical or logical locality without departing from the scope of the present invention. A logical locality is defined between nodes that are operational neighbors even if they are not physical neighbors.

In the most general case, each node 10 makes observations in its physical locale, processes the observation at its own processor, and performs an action predicated on the processing. However, in accordance with the present invention, each node 10 also shares its observation with one or more neighboring nodes 10 within boundary 20. Accordingly, processing at any one node 10 determines it actions based an observations made from at least two of nodes 10. The particular observation-sharing scheme can be adapted to suit a particular application, one of which will be described further below.

To maintain a sense of processing order in local community 20, an embodiment of the present invention proceeds as follows. One of nodes 10 is selected as a leader node to start the process. The leader node processes its local observations along with those from at least one other of nodes 10 to determine an appropriate response/action. The response/action is implemented at the leader node, and data indicative of the response/action is transferred to the remaining nodes 10 within local community 20. The current leader node's response/action is fixed or frozen at the response/action so-determined and thereafter excluded from further current-cycle processing, while the remaining ones of nodes 10 implement the response/action. Node leadership is then relinquished to another one of nodes 10 where it will assume the above-described leader's duties to (i) determine an appropriate response/action, (ii) implement that response/action, (iii) transfer data indicative of the response/action to remaining ones of nodes 10 that are not or have not been a leader, and (iv) relinquish node leadership to another node that has not been a leader.

The above-described process continues for all of nodes 10 within local community boundary 20. The entire process cycle is repeated whenever conditions change such that new responses/actions are warranted. The order of node leadership designations can be the same or different than that used in the previous process cycle without departing from the scope of the present invention.

A specific application of the present invention will be explained for adaptive noise reduction. By way of example, a description will be provided herein for adaptive noise reduction for a hollow-duct such as an aircraft engine's nacelle in accordance with the present invention. A typical aircraft will have one or more engines on either side of its fuselage. Each engine can be thought of as a global environment. Conversely, the combined field of all engines may also be considered a global environment.

Figure 3:
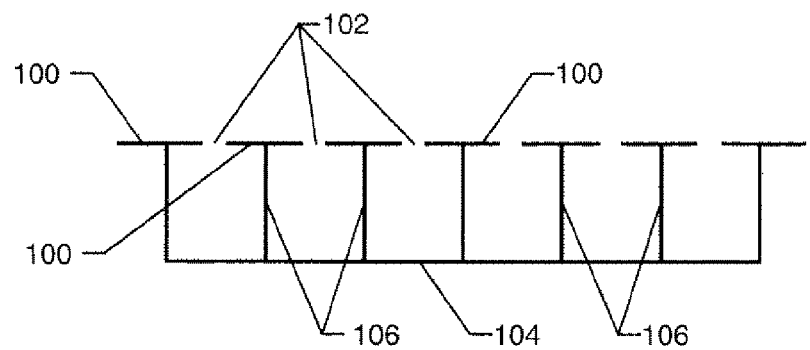
FIG. 3 is a side schematic view of a tunable Helmholtz resonator liner.

As is known in the art of aircraft engine noise reduction, an engine's nacelle is typically lined with a noise attenuation liner. The current state-of-the-art constructs this liner using static and passive Helmholtz resonators. Recent research has developed tunable electromechanical resonators (i.e., adjacent Helmholtz resonators with a compliant piezoelectric backplate). A portion of such an adaptive Helmholtz resonator liner is illustrated in FIG. 3 where the liner's exterior surface is defined by a faceplate 100 having holes 102 formed therethrough. Faceplate 100 is separated from a tunable backplate 104 by supports 106. Tunable backplate 104 is typically made from a compliant piezoelectric material. The characteristics of the piezoelectric backplate can be dynamically changed to alter the resonators' attenuation/absorption characteristics. More specifically, the resonators can be tuned in terms of one or both of the resonator's resistance and reactance in order to change the acoustic independence of the resonator. Such tunable resonators are described in detail by R. Taylor et al. in "Technology Development for Electromechanical Acoustic Liners," Paper A04-93, Active 04, Williamsburg, Va., September 2004, and by F. Lin et al. in "A Tunable Electromechanical Helmholtz Resonator," $9^{th}$ AIAA/CAES Aeronautics Conference and Exhibit, AIAA 2003-3145, May 12-14, 2003.

Figure 4:
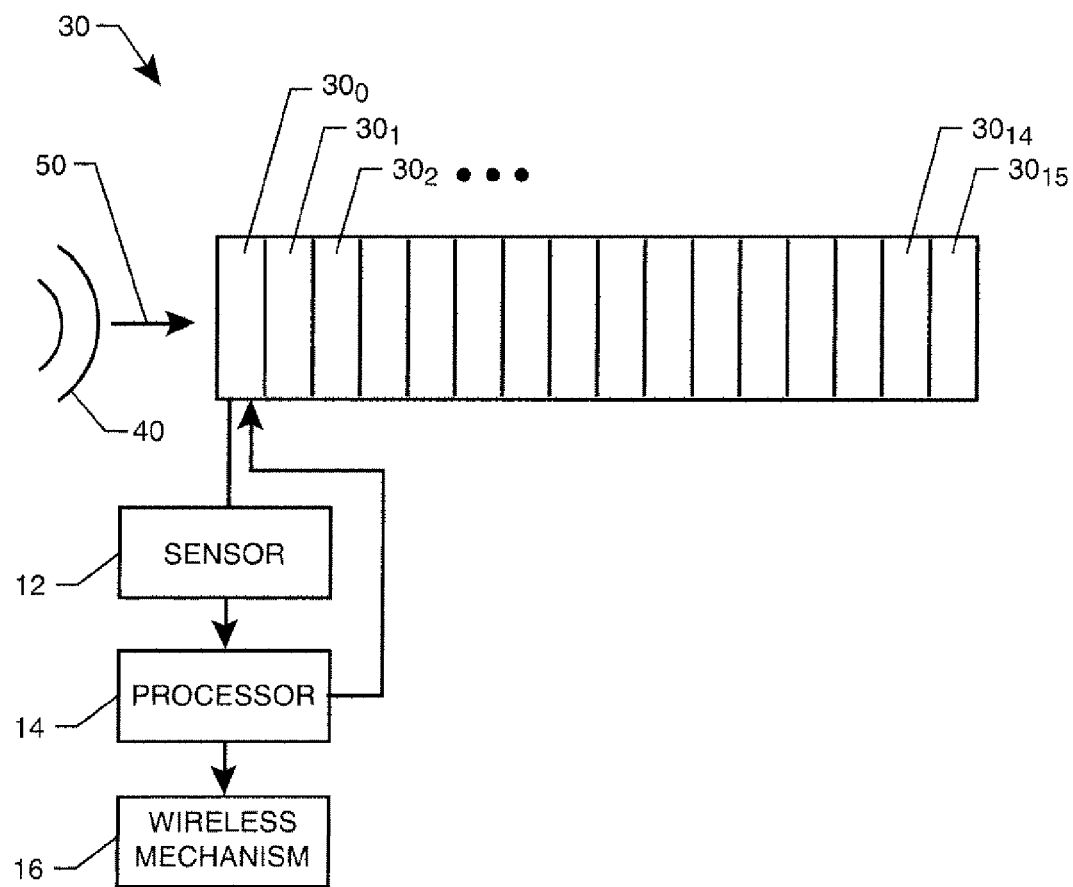
FIG. 4 is a schematic view of a segmented, tunable-resonator liner for use in adaptive noise reduction in accordance with an embodiment of the present invention.

By way of example, a simplified embodiment of an adaptive noise reduction panel (e.g., a panel liner for an aircraft engine nacelle) employing the concepts of the present invention will now be described. Referring now to FIG. 4, a longitudinal section of an engine nacelle liner is illustrated schematically and is referenced generally by numeral 30. Liner 30 is divided into a serial array of segments $30_0$-$30_{15}$ where an acoustic wave 40 that is to be attenuated is assumed, for purpose of this illustration, to propagate in the direction of arrow 50, so that wave 40 is first incident on liner segment $30_0$, then liner segment $30_1$, etc. It is to be understood that the number of segments is not a limitation of the present invention. Further, each of the segments could be in a different shape, for example, in the shape of a ring or portion thereof, without departing from the scope of the present invention. For purposes of the present invention, each of segments $30_0$-$30_{15}$ is constructed as a set of tunable resonators so that each segment forms the actuator portion of a node that includes at least one sensor/observer 12, a processor 14, and a wireless mechanism 16. Note that these node elements are illustrated for segment $30_0$; however, they have been omitted for the remainder of the segments to maintain clarity in the figures.

To assess the need to change the impedances of segments $30_0$-$30_{15}$, the present approach assesses one or more metrics of noise such as pressure, acoustic power, acoustic velocity, frequency, etc., the choice of which is not a limitation of the present invention. For purpose of the illustrative example, the assessed noise metric can be any objective function readily computed using information sensed by sensor 12. The exemplary process of adaptive noise reduction begins by designating the first segment $30_0$ as the leader segment with all other segments being designated as "slaves" for control by the leader segment. The leader segment then calculates its noise metric. That is, processor 14 at segment $30_0$ calculates the noise metric associated with the initial (or most recent) impedance of segment $30_0$ and the information detected by sensor 12 at segment $30_0$. The last segment $30_{15}$ similarly calculates its noise metric associated with the initial (or most recent) impedance of segment $30_{15}$ and the information detected by its associated sensor (not shown). The noise metric from the last segment $30_{15}$ is wirelessly transmitted from segment $30_{15}$ for reception by wireless mechanism 16 associated with segment $30_0$. The leader segment (currently segment 30C) compares noise metrics associated with the two segments, and then searches the impedance domain (i.e., possible values of resistances and reactances) for values that optimize (e.g., minimizes or maximizes depending on the application) the objective function. A variety of iterative impedance domain search techniques can be employed without departing from the scope of the present invention. The impedance domain search can be a simple exhaustive search (i.e., all possibilities are sampled and evaluated), or intelligently-driven to efficiently arrive at an "optimized" objective function value that can be the absolute or approximate optimal solution.

The impedance resulting in an "optimized" configuration becomes the new impedance for the leader segment and all of its slaves. That is, when segment $30_0$ is the leader, all segments $30_0$-$30_{15}$ are tuned to this new impedance as the optimized impedance is wirelessly transmitted to each of the "slave" segments' corresponding wireless mechanisms.

With the impedance of segment $30_0$ being fixed or frozen, leadership transitions to the next successive segment, i.e., segment $30_1$ in this case. Segment $30_1$ along with its associated sensor, processor, and wireless mechanism repeat the above-described process with segments $30_2$-$30_{15}$ being designated as "slaves". Once again, the chosen metric is computed and optimized between segments $30_1$ and $30_{15}$. The optimized impedance becomes the impedance value for the new leader, i.e., segment $30_1$, and is wirelessly transmitted to each of the other segments $30_2$-$30_{15}$ for the re-tuning thereof. The new leader segment $30_1$ has its impedance fixed or frozen, and the leadership designation is passed to the next successive segment $30_2$ where the above-described process is again repeated. This process is continually repeated until segment $30_{14}$, as leader, freezes its impedance and dictates this impedance to the only remaining "slave" segment $30_{15}$.

The acoustic impedances set in accordance with the above-described process remain "frozen" until the sound (or pressure) associated with acoustic wave 40 changes. More specifically, the change must be such that the attenuation provided by the current impedance of segment $30_0$ does not satisfy threshold criteria for attenuation. When this occurs, segment $30_0$ is again designated as the leader segment and the above-described process is repeated for all of the segments in liner 30.

It is to be understood that adaptive noise reduction in accordance with the present invention is not limited to a one-dimensional serial array of segments as just described. That is, the more general leader-node approach described earlier herein can be applied to any two or three-dimensional arrangement of segments. A leader's neighbor selection rules and leadership succession rules can be developed for a particular application without departing from the scope of the present invention.

The advantages of the present invention are numerous. Local communities of wireless sensor/actuator nodes operate autonomously to observe, make decisions, and then act at the local node level. Since as few as two nodes are required in a decision/action processes, data transfer is minimized and computations are simple thereby leading to an overall system that is extremely efficient. It has been found that decisions/ actions taken by local communities configured in this fashion yield good global results with computational efficiency. For example, the general approach described herein is well suited for adaptive noise reduction in aircraft engine nacelles.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of adjusting acoustic impedances for impedance-tunable acoustic segments, comprising the steps of:
    providing a plurality of impedance-tunable acoustic segments for exposure to an acoustic wave wherein a first acoustic segment through an N-th acoustic segment are defined;
    designating said first acoustic segment as a leader;
    determining a noise-reducing impedance for said acoustic segment so-designated as said leader using (i) at least one metric associated with said acoustic wave at said leader, and (ii) said at least one metric associated with said acoustic wave at said N-th acoustic segment;
    tuning said leader, said N-th acoustic segment, and remaining ones of said acoustic segments exclusive of said leader and said N-th acoustic segment, to said noise-reducing impedance so-determined;
    excluding said leader so-tuned from subsequent steps in said method;
    re-designating one of said remaining ones of said acoustic segments to be said leader; and
    repeating said steps of determining, tuning, excluding, and re-designating, for each of said acoustic segments through an (N−1)-th one of said acoustic segments.

2. A method according to claim 1, wherein said step of determining is accomplished using a wireless sensor and actuator node at each of said leader and said N-th acoustic segment.

3. A method according to claim 1, wherein each of said acoustic segments includes adaptive resonators, and wherein said step of tuning comprises the step of changing at least one of resistance and reactance of said adaptive resonators.

4. A method according to claim 1, wherein said acoustic segments are arranged inside a duct.

5. A method according to claim 3, wherein said acoustic segments are arranged inside a duct.

6. A method according to claim 1, wherein said acoustic segments are arranged inside an engine nacelle.

7. A method according to claim 3, wherein said acoustic segments are arranged inside an engine nacelle.

8. A method according to claim 1, further comprising the step of continuously monitoring change in said acoustic wave at said first acoustic segment wherein, when said change exceeds a threshold, said method repeats said steps of designating, determining, tuning, excluding, re-designating, and repeating.

9. A method according to claim 1, wherein said step of determining is carried out at said leader.

10. A method according to claim 1, wherein said step of determining includes the step of wirelessly transmitting said at least one metric associated with said acoustic wave at said N-th acoustic segment to said leader.

11. A method according to claim 1, wherein said step of tuning includes the step of wirelessly transmitting said noise-reducing impedance so-determined from said leader to said N-th acoustic segment and each of said remaining ones of said acoustic segments.

12. A method of adjusting acoustic impedances for impedance-tunable acoustic segments, comprising the steps of:
    providing a plurality of impedance-tunable acoustic segments arrayed serially in a direction of an acoustic wave that propagates therealong wherein a first acoustic segment through an N-th acoustic segment are defined relative to said direction;
    designating said first acoustic segment as a leader;
    determining a noise-reducing impedance for said acoustic segment so-designated as said leader using (i) at least one metric associated with said acoustic wave at said leader, and (ii) said at least one metric associated with said acoustic wave at said N-th acoustic segment;
    tuning said leader, said N-th acoustic segment, and each of said acoustic segments between said leader and said N-th acoustic segment, to said noise-reducing impedance so-determined;
    re-designating said leader to be a next successive one of said acoustic segments relative to said direction; and
    repeating said steps of determining, tuning, and re-designating, for each of said acoustic segments through an (N−1)-th one of said acoustic se rents.

13. A method according to claim 12, wherein said step of determining is accomplished using a wireless sensor and actuator node at each of said leader and said N-th acoustic segment.

14. A method according to claim 12, wherein each of said acoustic segments includes adaptive resonators, and wherein said step of tuning comprises the step of changing at least one of resistance and reactance of said adaptive resonators.

15. A method according to claim 12, wherein said acoustic segments are arrayed along the inside of a duct.

16. A method according to claim 14, wherein said acoustic segments are arrayed along the inside of a duct.

17. A method according to claim 12, wherein said acoustic segments are arrayed along the inside of an engine nacelle.

18. A method according to claim 14, wherein said acoustic segments are arrayed along the inside of an engine nacelle.

19. A method according to claim 12, further comprising the step of continuously monitoring change in said acoustic wave at said first acoustic segment wherein, when said change exceeds a threshold, said method repeats said steps of designating, determining, tuning, re-designating, and repeating.

20. A method according to claim 12, wherein said step of determining is carried out at said leader.

21. A method according to claim 12, wherein said step of determining includes the step of wirelessly transmitting said at least one metric associated with said acoustic wave at said N-th acoustic segment to said leader.

22. A method according to claim 12, wherein said step of tuning includes the step of wirelessly transmitting said noise-reducing impedance so-determined from said leader to said N-th acoustic segment and each of said acoustic segments between said leader and said N-th acoustic segment.

23. A method of adjusting acoustic impedances for impedance-tunable acoustic segments, comprising the steps of:
    providing a plurality of impedance-tunable acoustic segments arrayed serially in a direction of an acoustic wave that propagates therealong wherein a first acoustic segment through an N-th acoustic segment are defined relative to said direction;
    designating said first acoustic segment as a leader;
    determining, at said leader, a noise-reducing impedance for said acoustic segment so-designated as said leader using (i) at least one metric associated with said acoustic wave at said leader, and (ii) said at least one metric associated with said acoustic wave at said N-th acoustic segment;

wirelessly transmitting said noise-reducing impedance so-determined from said leader to said N-th acoustic segment and each of said acoustic segments between said leader and said N-th acoustic segment;

tuning said leader, said N-th acoustic segment, and each of said acoustic segments between said leader and said N-th acoustic segment, to said noise-reducing impedance so-determined;

re-designating said leader to be a next successive one of said acoustic segments relative to said direction; and repeating said steps of determining, wirelessly transmitting, tuning, and re-designating, for each of said acoustic segments through an (N−1)-th one of said acoustic segments.

24. A method according to claim 23, wherein said step of determining is accomplished using a wireless sensor and actuator node at each of said leader and said N-th acoustic segment.

25. A method according to claim 23, wherein each of said acoustic segments includes adaptive resonators, and wherein said step of tuning comprises the step of changing at least one of resistance and reactance of said adaptive resonators.

26. A method according to claim 23, wherein said acoustic segments are arrayed along the inside of a duct.

27. A method according to claim 25, wherein said acoustic segments are arrayed along the inside of a duct.

28. A method according to claim 23, wherein said acoustic segments are arrayed along the inside of an engine nacelle.

29. A method according to claim 25, wherein said acoustic segments are arrayed along the inside of an engine nacelle.

30. A method according to claim 23, further comprising the step of continuously monitoring change in said acoustic wave at said first acoustic segment wherein, when said change exceeds a threshold, said method repeats said steps of designating, determining, wirelessly transmitting, tuning, re-designating, and repeating.

31. A method according to claim 23, wherein said step of determining includes the step of wirelessly transmitting said at least one metric associated with said acoustic wave at said N-th acoustic segment to said leader.

* * * * *